United States Patent [19]

Maycock

[11] Patent Number: 5,093,568

[45] Date of Patent: Mar. 3, 1992

[54] MONITORING SYSTEM FOR FIBER OPTIC CABLES UTILIZING AN OTDR FOR DETECTION OF SIGNAL LOSS AND AUTOMATIC LOCATION OF FAULTS IN THE CABLE

[76] Inventor: John Maycock, 2546 W. 6th Ave., Vancouver, British Columbia, Canada, V6K 1W5

[21] Appl. No.: 627,681

[22] Filed: Dec. 14, 1990

[51] Int. Cl.[5] ............................................. H01J 5/16
[52] U.S. Cl. ................................ 250/227.14; 356/73.1; 250/227.15
[58] Field of Search ...................... 250/227.14, 227.12, 250/227.15; 356/73.1

[56] References Cited

U.S. PATENT DOCUMENTS

| | | | |
|---|---|---|---|
| 4,685,799 | 8/1987 | Brininstool | 356/73.1 |
| 4,830,513 | 5/1989 | Grego | 250/227.14 |
| 4,875,772 | 10/1989 | Gentile | 356/73.1 |
| 4,898,463 | 2/1990 | Sakamoto et al. | 356/73.1 |

FOREIGN PATENT DOCUMENTS

0115349 5/1987 Japan ............................. 250/227.14

Primary Examiner—David C. Nelms
Assistant Examiner—Teresa Davenport
Attorney, Agent, or Firm—Townsend and Townsend

[57] ABSTRACT

A monitoring system continuously monitors fibre optic cables for faults and then enables automatic location of the fault in the cable. In the system an optical monitoring signal is generated and connected as an output signal to a first end of the fiber optic cable for transmission to the second end. The signal is then returned through the fiber optic cable to provide a return signal at the first end of the cable. A comparator at the first end compares the output signal and the return signal and provides corresponding difference data. An optical time domain reflectometer detects the location of a signal loss along the fiber optic cable and a data processing system determines the location of the signal loss from the corresponding difference data. A single optical time domain reflectometer can be used for monitoring a plurality of fiber optic cables.

10 Claims, 9 Drawing Sheets

MONITORING SYSTEM FOR FIBER OPTIC CABLES UTILIZING AN OTDR FOR DETECTION OF SIGNAL LOSS AND AUTOMATIC LOCATION OF FAULTS IN THE CABLE

FIELD OF THE INVENTION

The present invention relates to monitoring systems for use with fiber optic cables and, more particularly, to systems for monitoring fiber optic cables in order to detect unauthorized intrusions into the cables and faults in the cables.

The present system is useful in particular, but not exclusively, for monitoring the state of fiber optic cables carrying valuable telecommunications information, so as to warn against and to locate imminent failure points.

The present system is also useful in environments where secure data must pass over fiber optic cable links which are installed in non-secure buildings or routes, in which case the present system can be used to detect and to exactly locate any unauthorized attempt to collect data from the cables.

BACKGROUND OF THE INVENTION

The use of optical time domain reflectometers to detect and locate a fault in a fiber optic cable is well known. For example, U.S. Pat. No. 4,749,247, issued June 7, 1988 to Scott F. Large, discloses a self-monitoring link which utilizes a GRIN lens/blazed grating combination to multiplex an OTDR signal with data signals on a fiber optic communication link. A reference OTDR signature and a continuously determined average OTDR signature are compared and an alarm signal is generated when the continuously determined signature differs by a preselectable amount from the reference signature, a microprocessor being provided to adjust the preselectable limit in response to the operational parameters of the communication link.

U.S. Pat. No. 4,875,772, issued Oct. 24, 1989 to John R. Gentile, discloses a system which enables a single optical time domain reflectometer to monitor a plurality of cables. In one embodiment, this is achieved by using two lasers having different wavelengths, which are separately fired into different cables, the returning signals being fed to the appropriate port of a wavelength dependent coupler, whereas in another embodiment each laser simultaneously checks two cables having different lengths, the length difference enabling identification of the cable in which the fault has occurred.

However, an optical time domain reflectometer can detect only backscattered light. Such light represents only about one percent of the total light power transmitted through a fiber and, therefore, is of very low power and consequently difficult to detect. This difficulty can lead to confusion of the results or, if steps are taken to avoid such confusion, to reduced sensitivity. The electronic detection devices used, which are usually avalanche photodiodes, have a noise threshold such that, as a signal to be detected is reduced in amplitude, the probability of the detector registering the signal as noise instead of the signal itself increases. This leads to several disadvantages.

In commercially available optical time domain reflectometers, this problem is mitigated by digital sampling techniques which gather a predetermined number of samples of the signal. The results are then processed to extract the signal from the noise. The closer the signal level approaches the noise floor of the device, the more difficult this process becomes. For example, some commercially available optical time domain reflectometers sample over a twenty minute period, which is clearly unacceptable in many circumstances and, in particular, in security situations where it is important to detect rapidly any unauthorized attempt to collect data from a cable.

Thus, if an event occurs which causes a small change in the attenuation of the fiber or a splice, detection using an optical time domain reflectometer will always be considerably more difficult, since the change can easily be confused with noise inherent in the detection device. This leads to uncertainty of operation and requires interpretation of the results, based on probability.

Another difficulty is that the signal is attenuated by normal attenuation of the fiber being tested or monitored. Therefore, the further the light pulse has to travel, the lower the light level will be and, therefore, the closer the signal approaches the noise floor of the detector. Consequently, interpreting a feature or change in features at some distance away from the monitoring point becomes even more difficult.

Also, it has been found that variations in the diameter of an optic fiber can be misinterpreted as attenuation effects when using an optical time domain reflectometer. Such diameter variations may have a stable transmission loss but might exhibit an unstable backscatter signature under operating conditions.

For these various reasons, it is preferable to avoid the use of an optical time domain reflectometer for detecting anomalies, as distinct from determining the location of such anomalies.

U.S. Pat. No. 4,893,006, issued Jan. 9, 1990 to Toshiyuki Wakai et al, and U.S. Pat. No. 4,898,463, issued Feb. 6, 1990 to Takashi Sakamoto et al, disclose the use of optical time domain reflectometers for locating anomalies, with means for simplifying the manual operation involved in controlling the apparatus.

There is also commercially available a fiber optic alarm apparatus, marketed by Plexcom, Inc., of Simi Valley, Calif. under the trade name 911 FIBEROPTIC ALARM, which continuously monitors the integrity of a cable by sending light down one fiber to a remote end of a cable, recoupling the light there to another fiber for retransmission through the cable and checking the amount of received light.

This prior apparatus compensates for slow changes in light level, caused for example by temperature changes, component aging, loosening of connectors, etc., but remains sensitive to rapid changes in light level.

It is a disadvantage of this prior apparatus that it does not enable the location of a detected anomaly to be effected. Such location of the anomaly therefore requires wastage of true and consequential downtime and loss of revenue for data transmission, while separate apparatus is employed to locate the anomaly.

BRIEF SUMMARY OF THE INVENTION

It is an object of the present invention to enable a fiber optic cable to be continuously monitored for the existence of an anomaly in the form of a fault or an unauthorized intrusion and then to enable automatic location of the anomaly, without delay and without manual intervention.

It is also an object of the present invention to enable a plurality of fiber optic cables to be continuously monitored and to enable a single optical time domain reflectometer to detect the location of any fault or intrusion in any of the thus-monitored cables.

It is a further object of the present invention to provide a novel and improved fiber optic cable monitoring system capable of detecting gradual intrusion into a fiber optic cable.

According to the present invention, there is provided a monitoring and anomaly location system for a fiber optic cable, comprising, means for monitoring the fiber optic cable, the monitoring means comprising, means for generating an optical monitor signal, means for connecting the optical monitor signal as an output signal to a first end of the fiber optic cable for transmission to a second end thereof, means for returning the optical monitor signal through the fiber optic cable to provide a return signal at the first end thereof, and signal comparator means at the first end of the fiber optic cable for comparing the output signal and the return signal to provide a corresponding difference signal, means for determining the location of an anomaly along the fiber optic cable, the anomaly locating means comprising optical time domain reflectometer means for detecting the location along the fiber optic cable of a signal loss from the fiber optic cable, and control means responsive to the monitoring means for controlling the operation of the anomaly locating means, the control means comprising data processing means responsive to the difference data for initiating the operation of the optical time domain reflectometer means.

By using an appropriate switching arrangement operated by the control means, the optical time domain reflectometer can be connected to any one of a number of fiber optic cables. Thus, by providing each of these cables with a respective monitoring means, or by otherwise monitoring each of the cables for anomalies, a single optical time domain reflectometer can be economically utilized for all of the cables.

BRIEF DESCRIPTION OF THE DRAWINGS

Further features, objects and advantages of the present invention will appear from the following description thereof, given by way of example with reference to the accompanying drawings, in which.

DESCRIPTION OF THE PREFERRED EMBODIMENT

Figure 1:
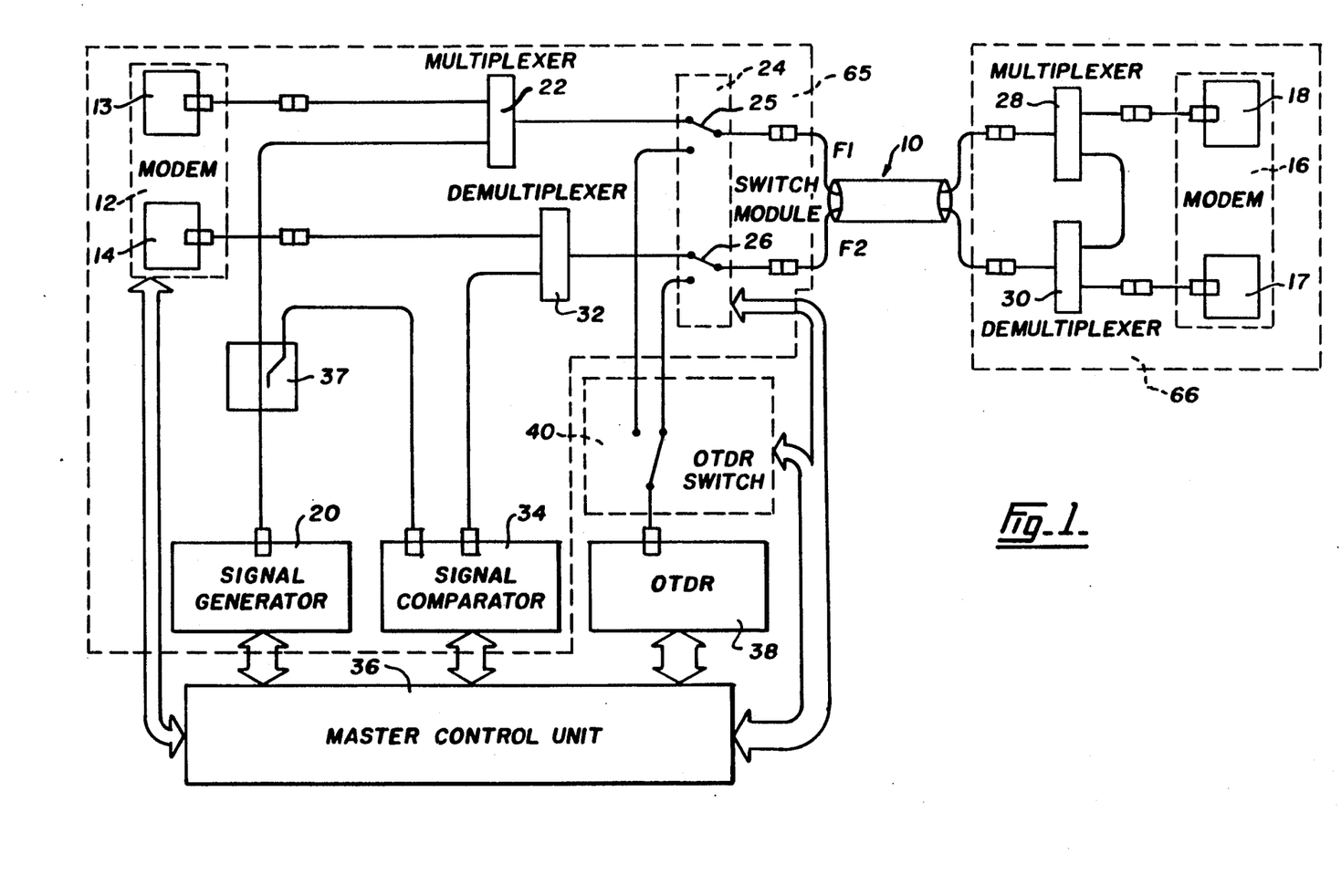
FIG. 1 shows a block diagram of a fiber optic cable monitoring system according to the present invention.

FIG. 1 of the drawings shows a monitoring system intended for monitoring the operation of a fiber optic cable, indicated generally by reference numeral 10 in FIG. 1.

The monitoring system has, at the near end of the cable 10, an optical data modem 12, which comprises a transmitter 13 for translating electronically coded data signals into optical data transmission signals for transmission through a fiber F1 of the cable 10, and a receiver 14, which translates a data transmission signal received from another fiber F2 of the cable 10 into an electronic signal for further processing or interpretation.

The remote end of the cable 10 is also provided with a modem 16, comprising a transmitter 17 and a receiver 18.

A detection or monitor signal, comprising light of a wavelength different from that of the data transmission signal from the transmitter 13, is generated in a monitor signal generator 20.

The detection signal from the signal generator 20 and the optic transmission signal from the transmitter 13 are multiplexed by a multiplexer 22, and the multiplexed signal is connected to the cable 10 through a signal path switch module 24, includes two 2-way switches 25 and 26. The switch 25 controls the connection of the multiplexer 22 to the fiber F1 of the cable 10, and the switch 26 controls the connection of the fiber F2 to an optical demultiplexer 32.

At the remote end of the cable 10, there is provided an optical demultiplexer 28, which separates the optical transmission signal from the detection signal. The demultiplexed data transmission signal is then supplied to the receiver 18, while the demultiplexed detection signal is multiplexed with an optical transmission signal from the transmitter 17, by means of a multiplexer 30. The signals multiplexed by the multiplexer 30 are transmitted through the fiber optic cable 10 from the remote end to the near end thereof, at which they are connected by the switch 26 to a demultiplexer 32.

The demultiplexed data transmission signal from the demultiplexer 32 is passed to the modem receiver 14, while the return detection signal from the demultiplexer 32 is connected to a signal comparator 34.

The purpose of the signal comparator 34 is to compare this return signal with the outgoing detection signal from the monitor signal generator 20 and to provide a difference signal, representing the difference between these two signals, to a master control unit 36.

Figure 2:
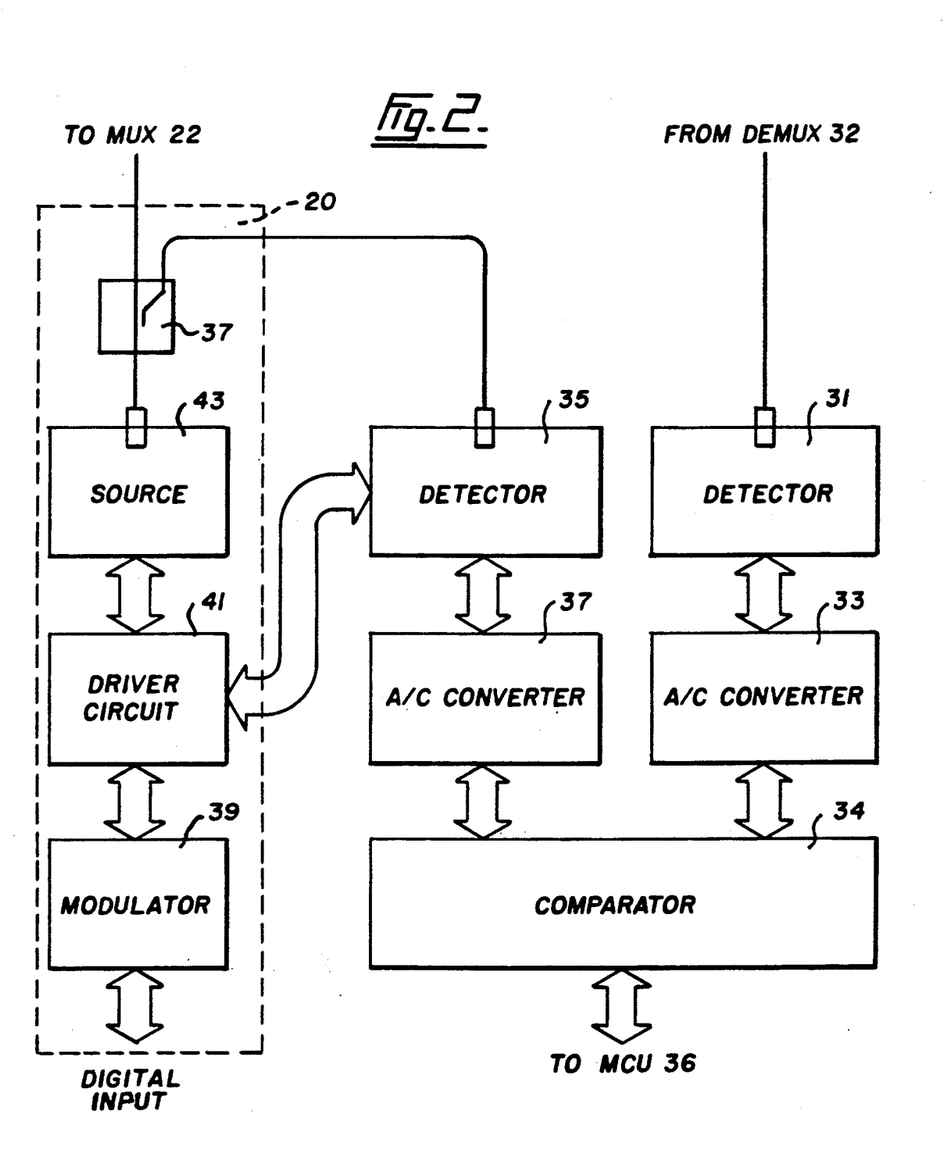
FIG. 2 shows a block diagram illustrating components of a signal generator and a signal comparator in the system of FIG. 1.

As shown in greater detail in FIG. 2, the signal comparator 34 has a detector 31 for changing the optical return detection signal from the demultiplexer 32 into an analog electrical signal and an analog-to-digital converter 33 for transferring this electrical signal in digital form to the comparator 34. The signal comparator 34 is also provided with a detector 35 and an analog-to-digital converter 37 for supplying to the comparator 34 the monitor signal from the signal generator 20, which is coupled to the detector 35 through a coupler 37.

The signal generator 20, as illustrated in FIG. 2, comprises a modulator 39, for modulating a digital input from the master control unit 36, and a driver circuit 41 interposed between the modulator 39 and a laser source 43, the output of which is connected to the multiplexer 22 through the coupler 37. The laser source 43 may be replaced by a LED source. The driver circuit 41 incorporates a facility for adjusting the drive current of the source to maintain a constant power output. The modulator 39 generates a pseudo random or predetermined code, which is used to modulate the detection signal so that if the detection signal is detected by an intruder, it may be mistaken for a data transmission signal, and the intruder therefore may not realize that he is tapping a monitored fiber. A modulated signal may also be used to eliminate the possible variations caused by the use of two different detectors.

The signal modulation rate and the pulse duration may be chosen such that the delay caused by the transmission of the pulses through the fiber cable and multiplexing devices results in the two inputs to the comparator 34 being present at their respective detectors 35 and 31 of the comparator at different times. That being the case, then the same detector can be used for their detection, which eliminates possible variations in response and sensitivity as might be found in such devices.

The coupler 37 is shown to facilitate the description of the system, and it will be appreciated by those skilled in the art that laser sources generally incorporate a pin diode, which therefore can take the place of the coupler 37 and the detector 35.

It will also be appreciated that the function of the comparator may be fulfilled by the master control unit 36.

Figure 3:
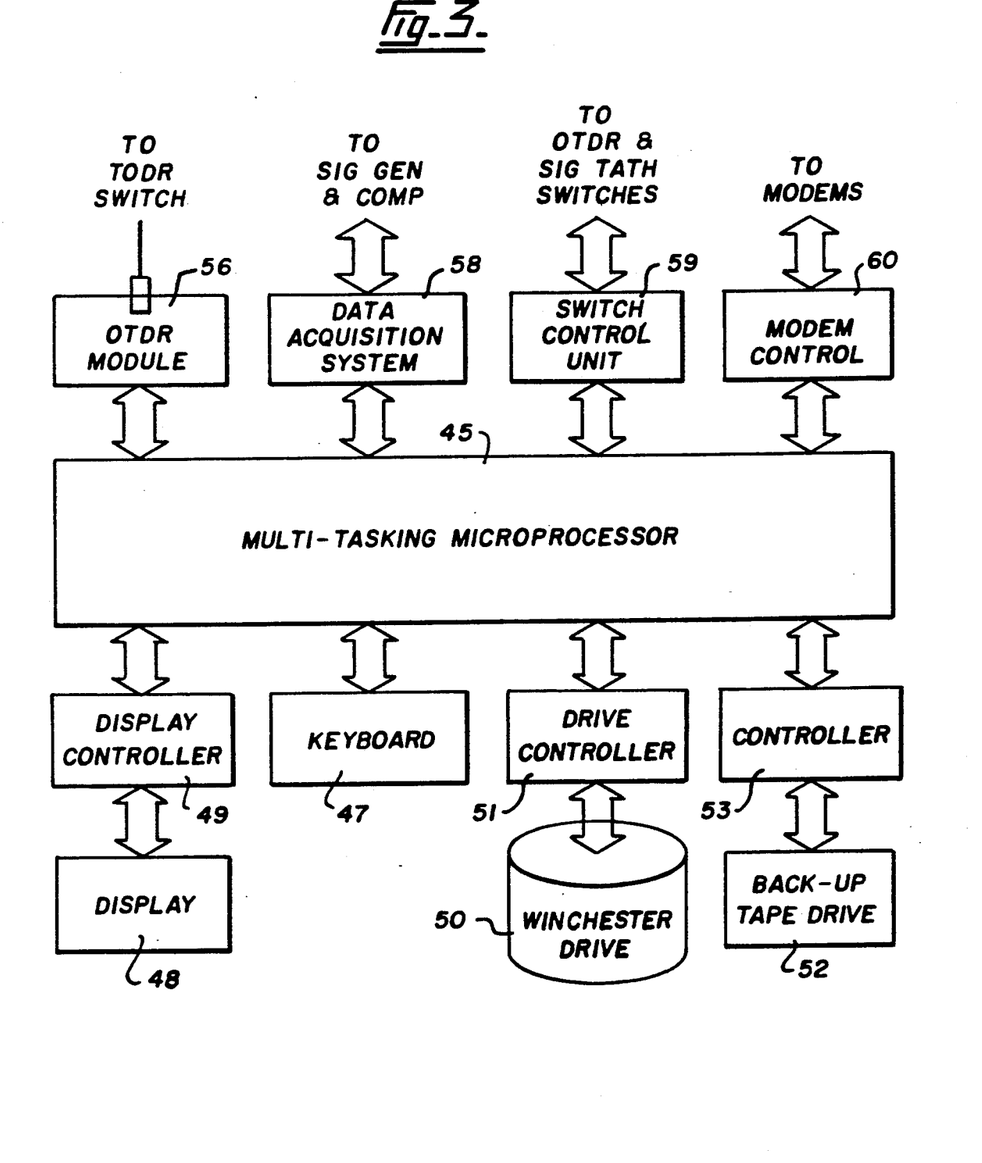
FIG. 3 shows a block diagram illustrating components and accessories of the control unit of the system of FIG. 1.

FIG. 3 shows in greater detail the components of the master control unit 35 and auxiliary apparatus.

As can be seen in FIG. 3, the master control unit 34 includes a software programable, multi-tasking microprocessor 45, having an input keyboard 47; a video display 48 connected to a display controller 49; a Winchester drive 50 connected to a drive controller 51 and a back-up tape drive 52 connected to a controller 53.

An OTDR module 56 is connected to the OTDR switch 38 and a data acquisition system 58 is connected to the signal generator 20 and the signal comparator 34. A switch control unit 59 is connected to the OTDR switch 40 and the signal path switch module 24. A modem control 60 is connected to the modem 12.

Figure 4:
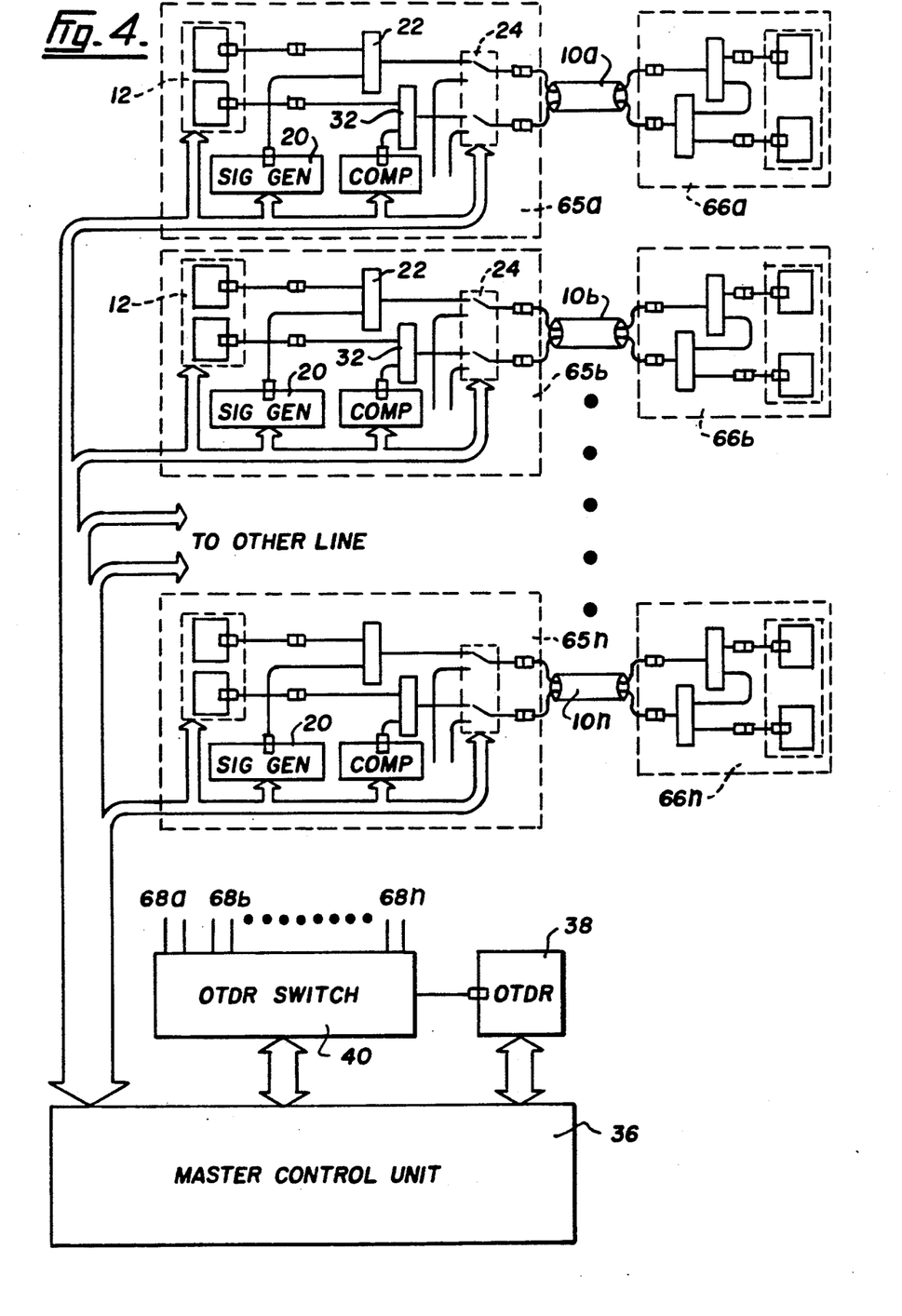
FIG. 4 shows a plurality of systems such as that of FIG. 1 combined in a multi-cable monitoring system.

While the master control unit 34 of FIG. 1 is associated with a single cable 10, the same control unit 34 may be employed to monitor a plurality of cables 10a . . . 10n, as shown in FIG. 4, in which each cable 10a–10n is provided with near end unit 65a–65n, and a far end unit 66a–66n, each comprising one each of the components within the corresponding boxes 65 and 66 shown in broken lines in FIG. 1.

In the multi-cable monitoring system shown in FIG. 4, the OTDR switch 40 is connected by fiber pairs 68*1*–68n to the switch module 24 of each near end unit 65a–65n.

Figure 5:
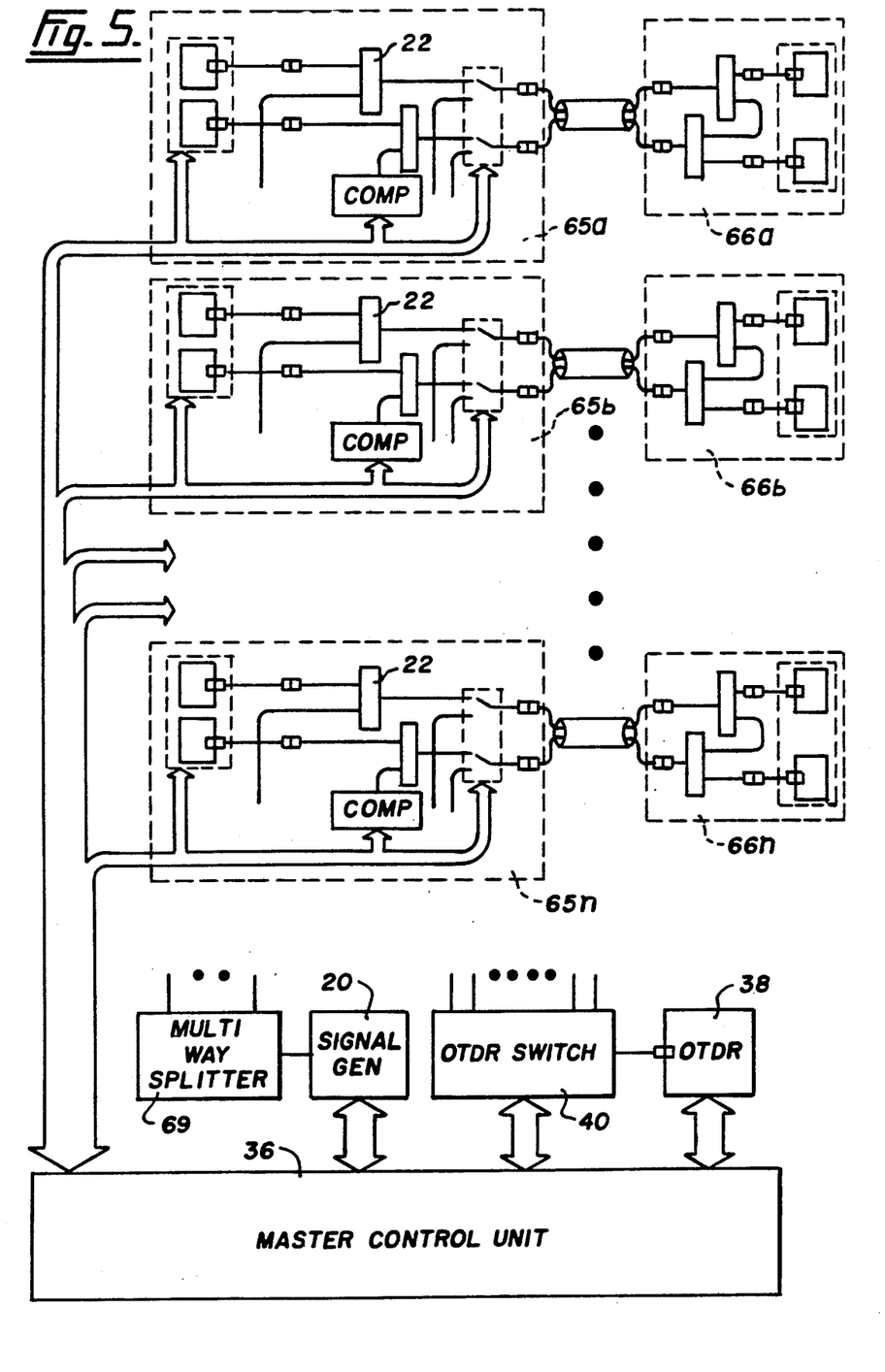
FIG. 5 shows a modification of the system of FIG. 4.

While each near end unit 65a–65n in the multi-cable system of FIG. 4 is provided with a respective signal generator 20, it is alternatively possible to replace these signal generators by a common signal generator 67, as shown in FIG. 5, which is connected through a multiway splitter 69 to the multiplexer 22 of each near end unit 65a–65n.

When the system detects a fault or intrusion in the cable 10, the master control unit 36 controls the switch module 24 so as to disconnect the multiplexer 22 and the demultiplexer 32 from the cable 10, thus immediately terminating the transmission of data through the cable 10. The master control unit 36 also operates a switch module 40, which is an OTDR switch enabling the single OTDR 38 to be used on either of the two fibers F1 and F2 of the cable 10, or on the fibers of other fiber optic cables being similarly monitored, the number of the cables being dependent on the number of ports of the OTDR switch 40.

In a modification of this arrangement, which is not illustrated in the drawings but which is useful for short cable systems, the OTDR can be used so as to "see" through the multiplexer and demultiplexer devices, so as to permit both fibers to be measured simultaneously.

The master control unit 36 processes the output data of length versus attenuation, provided by the OTDR by detection of Rayleigh backscatter and Fresnel reflections.

The detection signal launched into the fiber optic cable 10 may change over time, due to component aging characteristics. As the light output devices age, if the drive current is maintained at a constant level, the optical light output decreases. A compensation circuit is built in, which varies the drive current to maintain constant output power. Because of variations in temperature and aging of other components in the circuit, the light output will still show some changes over a long period of time.

The need to provide a long term stable light output from the signal generator 20 is avoided by comparing the input level of the detection signal to the cable 10 with the output level, i.e. the return signal which is the input to the signal comparator 34. In this way, the effects of long term drift are not confused with a change in system attenuation. However, the monitoring system still remains sensitive to longterm changes in attenuation, which may be part of a planned unauthorized attempt to collect data from the cable 10, and it will be apparent that such sensitivity is especially important in the security applications.

The output power of the source device in the signal generator 20 is monitored by the master control unit 36 to give an indication of device aging. A change in the return signal is determined, through a statistical algorithm, as falling into one of several warning levels. The action of each of such warning levels is determined by the type of link and is established upon installation of the monitoring system.

The information obtained by the OTDR 38 is compiled and compared with a stored reference for the respective fiber, in the master control unit 36. A statistical algorithm then provides an indication of the severity of the action to be taken. The location of any change in the backscatter which might indicate an area of potential damage or tampering with the cable 10 is then displayed, using a graphical representation along with other information necessary to locate the point of the fault.

The present monitoring system may be configured to monitor as many fibers as can be selected by the OTDR switch 40.

As mentioned above, in shorter systems the OTDR 38 has sufficient dynamic range to effectively measure both the outgoing detection signal and the return detection signal by looking through the far end demultiplexer 28 and multiplexer 30. In order to achieve this, the operating wavelength of the OTDR 38 must be the same as that of the source and the signal generator 20, which by definition is different from that of the modems 12 and 16.

The above-described operation of the monitoring and anomaly location system illustrated in the drawings is illustrated in greater detail in FIGS. 6 through 9.

Figure 6:
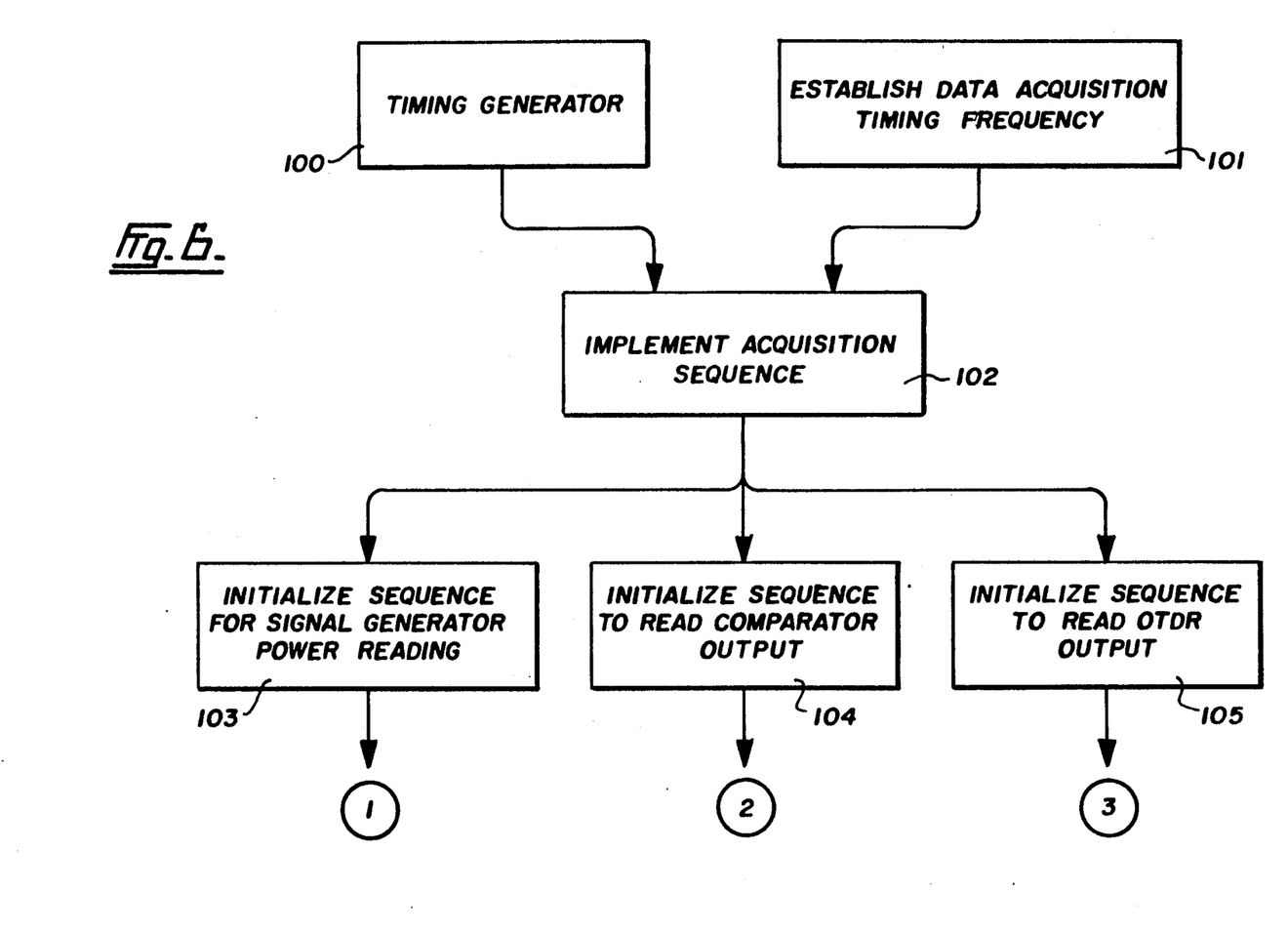
FIGS. 6 through 9 show block diagrams illustrating the operation of the systems of FIGS. 1 through 5.

Referring firstly to FIG. 6, the initial operation of the system comprises, in step 100, initiating operation of a time generator (not shown) in the master control unit 36, and in step 101 of establishing a data acquisition time frequency in the master control unit 36.

At step 102, the acquisition of data is initiated, which includes initializing reading by the master control unit 36 of the output power of the signal generator at step 103, initializing reading by the master control unit 36 of the output of the signal comparator 34 in step 104, and initializing the reading of the output of the OTDR 38 in step 105.

Figure 7:
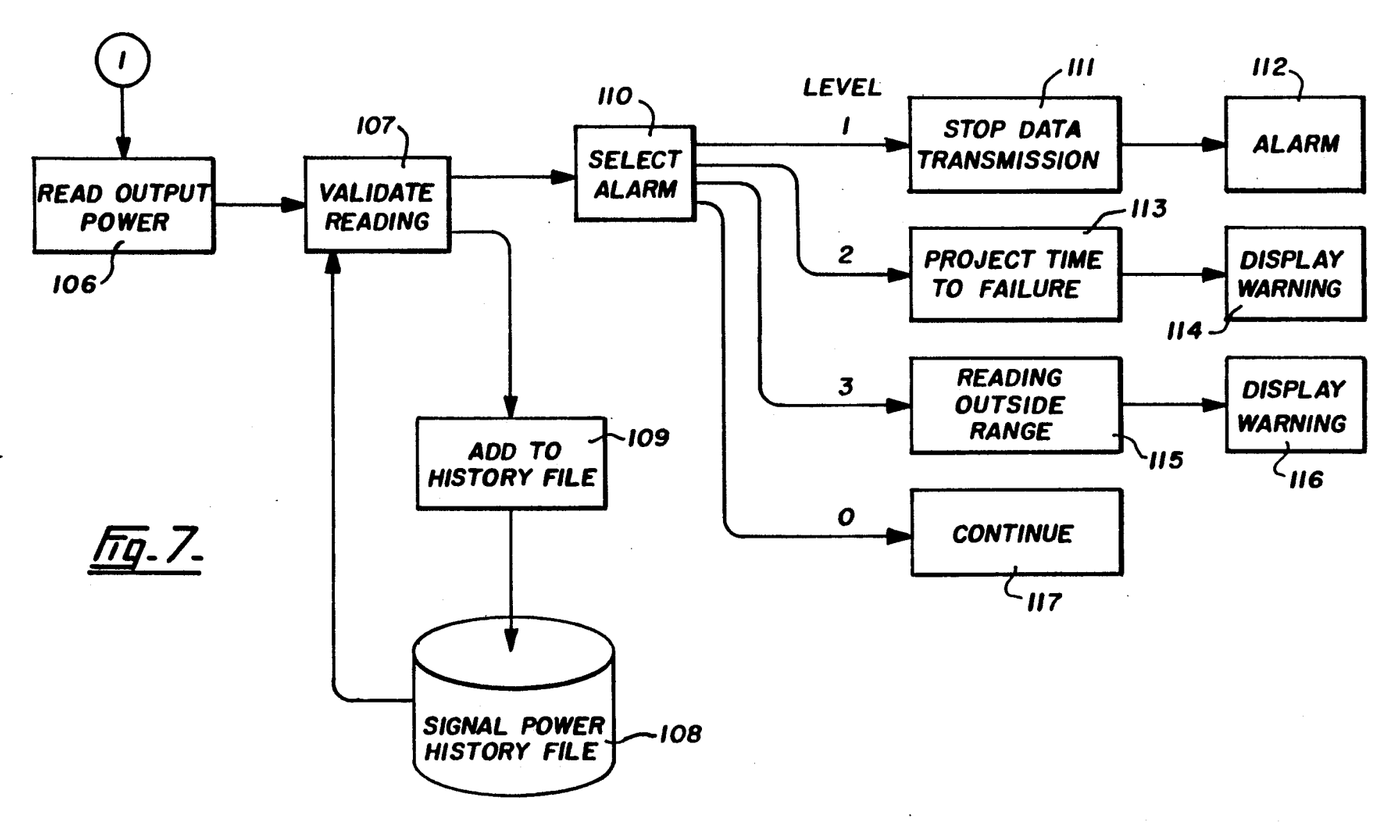

FIG. 7 illustrates in greater detail the processing of the signal generator power data reading initiated in step 103.

More particularly, in step 106, the output power of the signal generator 20 is read by the master control unit 36, and this output power data is validated in step 107. Such validation is effected by comparing this signal generator power output data with reference data obtained from a signal power history file 108, stored in the master control unit 36. More particularly, the signal validation comprises the steps of sampling the signal generator power output to obtain a multiplicity of readings in a short period of time, averaging these readings and then comparing the results to a reference value stored in the history file 108. A level is allocated to the result, depending upon whether the average is higher than, lower than or equal to the reference value obtained from the history file 108. If the average value is validated, then it is added, in step 109, to the history file to be available for future reference. If the validation step 107 reveals an unacceptable deviation in the signal generator power output, then at step 110 an alarm is selected. Depending on the level allocated to the average signal, the data transmission is terminated at step 111, by appropriate operation of the switch module 24, and an alarm signal is provided at step 112.

If, on the other hand, at step 113 a lower level is determined, the projected time to failure is determined by the master control unit 36, and at step 114 this information is shown on the display 48.

If, however, during the validation step 114 the average value is found to lie outside the predetermined range, then at step 115 this is determined and an appropriate warning is displayed, at step 116, by means of the display 48.

If the validation effected at 107 shows no unacceptable deterioration of the signal generator power output, then at step 117 the reading and validation procedure is continued, and the validated reading added to the signal power history fill 108.

Figure 8:
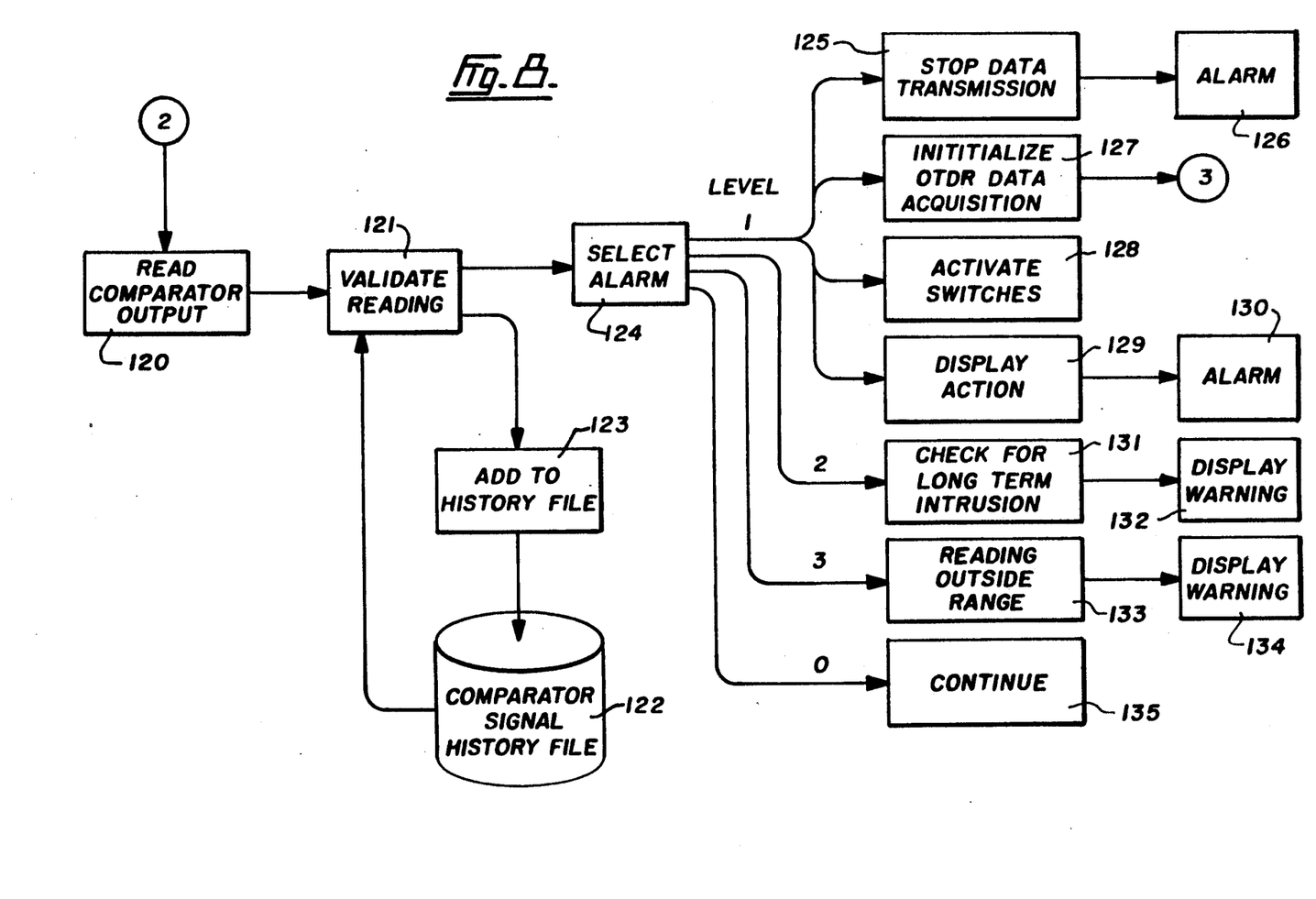

FIG. 8 illustrates a similar validation sequence for monitoring the output of the signal comparator 34. Thus, at step 120, the comparator output is read by the control unit 36, and the read data is validated at step 121. Such validation again comprises sampling and averaging, and comparing the average result to a reference value stored in a history file, which in this case is indicated by reference numeral 122. A level is again allocated to the average value, depending upon whether the value is higher than, lower than or equal to the reference value in the history file 122, and the validated reading is added to the comparator signal history file 122, in step 123 to be available for future reference.

At step 124 the alarm is selected, if necessary, so that at step 125 the data transmission is terminated by operation of the switch module 24, and an alarm is then given at step 126.

Figure 9:
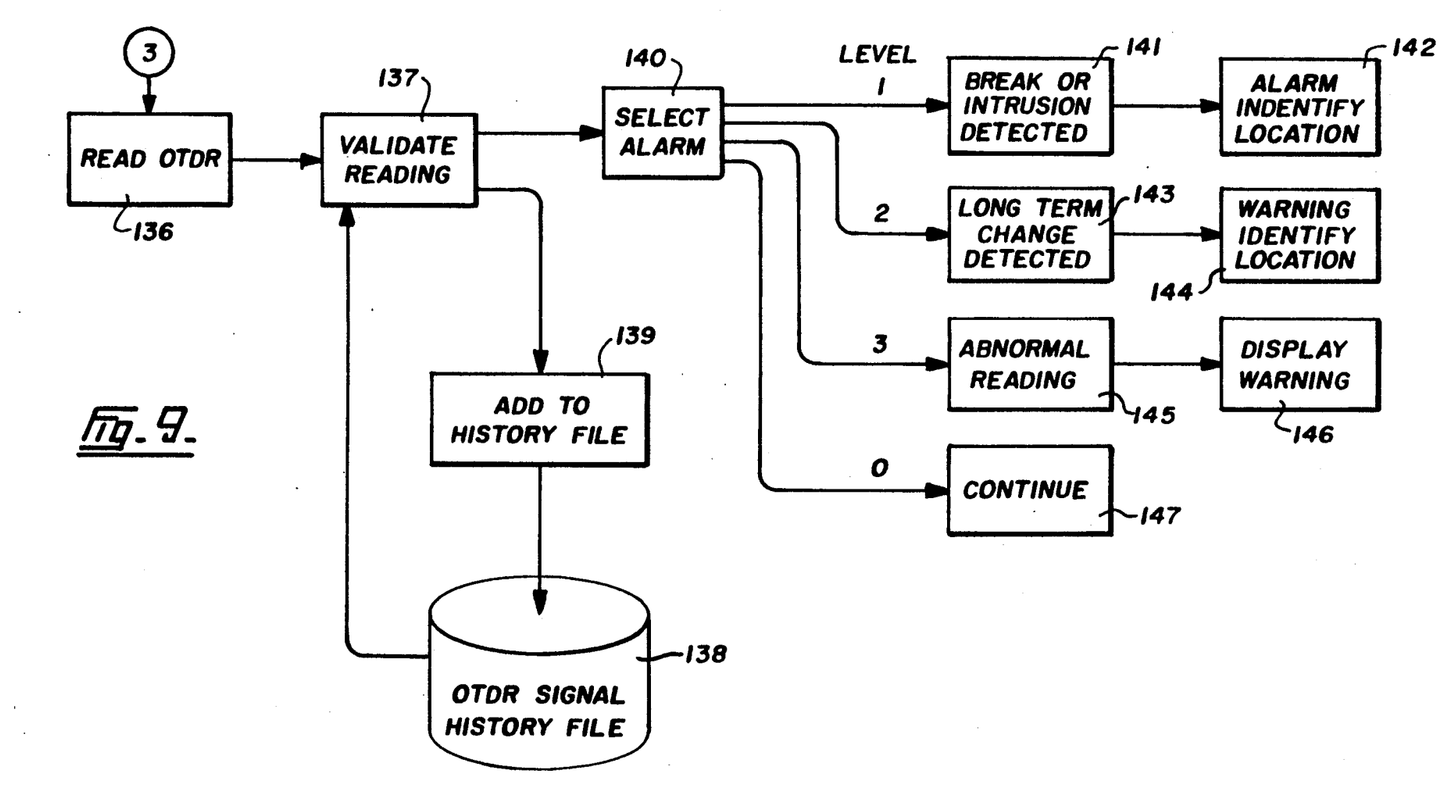

Simultaneously at step 127 the operation of the OTDR is initiated, which then proceeds in accordance with the sequence described below with reference to FIG. 9.

At the same time, at step 128 the OTDR switch 40 is operated to connect the OTDR 38 to the cable 10 (FIG. 1) or the appropriate one of the cables 10a–10n (FIG. 4 or FIG. 5).

Also, at step 129 this action is displayed on the display 48, and an alarm is indicated at step 130.

Step 131 represents detection of longterm intrusion, resulting in gradual degradation of the signal comparator output 34, which causes a display warning by the display 48 at step 132.

If the reading validated at step 121 lies outside a predetermined range, as determined at step 133, then a warning is displayed at step 134 by the display 48.

If, however, the reading is correctly evaluated at step 121, then at step 135 the above-described reading and validation of the comparator output is continued. The consequence of the initiation of the OTDR data acquisition at step 127 is illustrated in FIG. 9.

More particularly, at step 136, the output from the OTDR 38 is read into the master control unit 36, and at step 137 this OTDR output data is validated by comparison with reference date from an OTDR signal history file 138. This validation consists of a statistical line fit to data using leased squares or another algorithm. Slope and initial discontinuities are identified and stored in the history file 138 upon installation. The attenuation level for each section of the cable fiber under test is compared with values historically obtained and is also checked for long term degradation. The reading is added, at step 139, to the history file 138, and at step 140 an alarm is selected, if necessary. More particularly, if a break or intrusion is detected, as indicated at step 141, then an alarm is provided and the location of the intrusion is identified at step 142.

If a long term change is detected at step 143, then at step 144 a warning is provided, and the location of the anomaly is identified.

If an abnormal reading is detected at step 145, then an appropriate warning is provided at step 146.

If, at step 147 the OTDR output data indicates no anomaly, then at step 147 the above-described sequence of validation of the OTDR output is continued.

The use of switches such as the two way switches 25 and 26 in the switch module 24 and the OTDR switch 40 is prone to difficulties associated with the repeatability of the transmission loss each time a switch is operated. An electrical analogy is a variation in contact resistance each time a switch position is changed. This difficulty is overcome in the present invention by automatic compensation using the data stored in the history files (108, 122 and 138).

If after a switching operation, the readings obtained before the operation are found to be different to those currently being read, reference is made to the history files so that a compensation can be applied to the signal level to equalise the currently obtained readings with those in the history files. The adjustment amount is the amount by which a switch transmission loss has changed. If the switching action was made as a result of an alarm, then the level is compared to levels stored in the history files from a time before the alarm condition. A similar compensation is applied in the validation process for each of the three readings, (107, 121 and 137).

I claim:

1. A monitoring and anomaly location system for a fiber optic cable, comprising:
   (a) means for monitoring the fiber optic cable, said monitoring means comprising:
   means for generating an optical monitor signal;

means for connecting said optical monitor signal as an output signal to a first end of the fiber optic cable for transmission to a second end thereof;

means for returning the optical monitor signal through the fiber optic cable to provide a return signal at the first end thereof; and signal comparator means at the first end of the fiber optic cable for comparing the output signal and the return signal to provide corresponding difference data;

(b) means for determining the location of an anomaly along the fiber optic cable, said anomaly locating means comprising optical time domain reflectometer means for detecting the location along the fiber optic cable of a signal loss from the fiber optic cable; and (c) control means responsive to said monitoring means for controlling the operation of said anomaly locating means, said control means comprising data processing means responsive to the difference data for initiating the operation of said optical time domain reflectometer means.

2. A monitoring and anomaly location system as claimed in claim 1, wherein said control means further comprise means for storing reference data representing multiple prior examples of the difference data obtained during normal operation of the cable, said data processing means comprising means for comparing the prevailing difference data to the reference data and initiating operation of said optical time domain reflectometer means in response to a deviation of the former from the latter.

3. A monitoring and anomaly location system as claimed in claim 1, further comprising switch means for selectively connecting said optical time domain reflectometer means to any of a plurality of fiber optic cables under the control of said control means.

4. A monitoring and anomaly location system as claimed in claim 1, further comprising first switch means for connecting said monitoring means to a plurality of fiber optic cable, and second switch means for connecting said optical time domain reflectometer to any one of the cables, said control means including means of operating said first switch means to terminate data transmission through any one of the fibers upon detection of an anomaly in said one of the fiber and means for connecting said time domain reflectometer means to said one of the fibers.

5. A monitoring and anomaly location system for fiber optic cables, comprising:

(a) a plurality of cable monitoring devices for detecting faults and intrusions in a plurality of fiber optic cables;

said cable monitoring devices each comprising:
means for generating an optical monitor signal;
means for connecting said optical monitor signal as an output signal to a first end of a respective one of said fiber optic cables for transmission to a second end thereof;

means for returning the optical monitor signal as a return signal from the second end to the first end of the respective fiber optic cable; and means for comparing the input and output signals to provide corresponding difference data;

(b) means for locating an anomaly in any of the fiber optic cables, said anomaly locating means comprising;

optical time domain reflectometers means controlled by said control means for detecting the locations of faults and intrusion along the fiber optic cables;

(c) switch means responsive to said control means for connecting said optical time domain reflectometer means to said fiber optic cables; and (d) control means comprising means for storing reference data corresponding to multiple examples of the difference data obtained during normal operation of each cable and means for repeatedly comparing the reference data and the difference data to provide a warning in response to a deviation of the difference data from the reference data for any of the cables.

6. A monitoring and anomaly location system as claimed in claim 5, further comprising display means responsive to said control means for visually displaying data indicating the locations of the faults and intrusions.

7. A monitoring and anomaly location system as claimed in claim 5, wherein said signal generating means comprise a single signal generator and means for connecting the optical monitor signal from the single signal generator to each of the cable.

8. A monitoring and anomaly location system as claimed in claim 5, wherein said control means further comprise means for storing history data representing the power output of said signal generator means and means for comparing the history data with the prevailing power output of said signal generating means to provide a warning signal in response to a deviation of the latter from the former.

9. A monitoring and anomaly location system as claimed in claim 5, wherein said control means comprise means for storing output data from said optical time domain reflectometer means as historical data, and means for comparing prevailing output data from said optical time domain reflectometer means with the historical data to detect long term degradation.

10. A monitoring and anomaly location system as claimed in claim 1 wherein the signal comparator means for comparing the output signal and the return signal includes a single detector, and wherein rate and pulse of the optical monitor signal are selected to provide a delay so that the detector details the output signal and the return signal separately.

* * * * *